United States Patent
Fukuta et al.

(10) Patent No.: US 8,542,283 B2
(45) Date of Patent: Sep. 24, 2013

(54) IMAGE PROCESSING DEVICE, IMAGE PROCESSING METHOD, AND INFORMATION TERMINAL APPARATUS

(75) Inventors: Tomonori Fukuta, Tokyo (JP); Junko Shinohara, Tokyo (JP); Naoyuki Fujiyama, Tokyo (JP); Yoshiko Hatano, Tokyo (JP); Tetsuya Kuno, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/618,543

(22) Filed: Sep. 14, 2012

(65) Prior Publication Data

US 2013/0010142 A1 Jan. 10, 2013

Related U.S. Application Data

(62) Division of application No. 11/919,119, filed as application No. PCT/JP2005/007999 on Apr. 27, 2005, now Pat. No. 8,319,840.

(51) Int. Cl.
- *H04N 5/228* (2006.01)
- *H04N 7/18* (2006.01)
- *G06K 9/00* (2006.01)
- *G06K 9/48* (2006.01)
- *G06K 9/40* (2006.01)

(52) U.S. Cl.
USPC ............... 348/208.4; 348/222.1; 348/155; 382/107; 382/199; 382/275

(58) Field of Classification Search
USPC ............... 348/208.99–208.16, 222.1, 143, 348/154, 155, 169–172; 382/103, 107, 199, 382/254–275
See application file for complete search history.

(56) References Cited

U.S. PATENT DOCUMENTS 4,837,632 A * 6/1989 Kubo et al. ............... 348/208.6
5,666,158 A   9/1997 Sekine et al.
(Continued)

FOREIGN PATENT DOCUMENTS

GB   2280812 A   2/1995
JP   4-11469 A   1/1992
(Continued)

OTHER PUBLICATIONS

Cai Z Q. "Ringing Artefact Reduction Using Adaptive Averaging Filtering". Consumer Electronics, 2004 IEEE International Symposium on Reading, UK, Sep. 1-3, 2004, Piscataway, NJ, US, Sep. 1, 2004, pp. 156-159, XP010755763.

(Continued)

*Primary Examiner* — Sinh Tran
*Assistant Examiner* — Mark Monk
(74) *Attorney, Agent, or Firm* — Birch, Stewart, Kolasch & Birch, LLP (57) ABSTRACT

Provision is made for obtaining a high-quality image with noise, such as ringing, reduced. An image processing device includes an image correction means for applying image-shake correction processing to an input image; a correction-image characteristic detection means for detecting a characteristic of a correction image obtained through the image-shake correction processing; a first characteristic-determination means for outputting selection information, based on a characteristic-detected correction image obtained through detection of the characteristic of the correction image; and an image outputting means for outputting the input image or the correction image, based on the selection information. As a result, it is made possible to obtain a high-quality image with noise reduced.

4 Claims, 7 Drawing Sheets

(56) References Cited

U.S. PATENT DOCUMENTS

| | | | |
|---|---|---|---|
| 5,729,290 A | 3/1998 | Tokumitsu et al. | |
| 6,411,741 B1* | 6/2002 | Hamamura et al. | 382/254 |
| 2002/0167597 A1 | 11/2002 | Nakano et al. | |
| 2004/0207758 A1* | 10/2004 | Sai et al. | 348/627 |
| 2005/0030302 A1* | 2/2005 | Nishi et al. | 345/204 |

FOREIGN PATENT DOCUMENTS

| | | |
|---|---|---|
| JP | 7-65163 A | 3/1995 |
| JP | 10-320535 A | 12/1998 |
| JP | 11-120481 A | 4/1999 |
| JP | 2000-341577 A | 12/2000 |
| JP | 2004-186901 A | 7/2004 |
| JP | 2006-101447 A | 4/2006 |

OTHER PUBLICATIONS

Hadar O et al. "Restoration of Images Degraded by Extreme Mechanical Vibrations". Optics and Laser Technology, Elsevier Science Publishers BV., Amsterdam, NL, vol. 29, No. 4, Jun. 1, 1997, pp. 171-177, XP004084885.

Kimata H et al. "Edge Preserving Pre-Post Filtering for Low Bitrate Video Coding". Proc. 2001 Int. Conf. on Image Processing, Thessaloniki, Greece, vol. 3, Oct. 7, 2001, pp. 554-557, XP010563406.

Tan K-C et al. "Restoration of Real-World Motion-Blurred Images". CVGIP Graphical Models and Image Processing, Academic Press, Duluth, MA, US, vol. 53, No. 3, May 1, 1991, pp. 291-299, XP000200580.

* cited by examiner

FIG.2

HORIZONTAL-DIRECTION EDGE COMPONENT
HORIZONTAL-DIRECTION EDGE COMPONENT

FIG.3

VERTICAL-DIRECTION EDGE COMPONENT

IMAGE PROCESSING DEVICE, IMAGE PROCESSING METHOD, AND INFORMATION TERMINAL APPARATUS

CROSS REFERENCE TO RELATED APPLICATION

This application is a Divisional of co-pending U.S. application Ser. No. 11/919,119 filed on Oct. 24, 2007, which is a continuation application of PCT/JP2005/007999 filed on Apr. 27, 2005. The entire contents of all the above applications are hereby incorporated by reference.

TECHNICAL FIELD

The present invention relates to an image processing device and an image processing method for reducing the effect of a hand jiggle at the time instant when an image is captured, a jiggle caused by a movement of the image-capturing system itself, or the like. The present invention can be applied, for example, to an image-capturing device mounted in an information terminal apparatus such as a mobile phone or a PDA (Personal Digital Assistant), a digital still camera, a digital movie camera, and the like.

BACKGROUND OF THE INVENTION

To date, a phenomenon has been known in which, when a photographic subject is shot with a silver-salt-film camera or a digital still camera held in hands, the camera shake due to a hand jiggle causes such deterioration as shifts the captured image in the hand-jiggle direction.

In order to correct the foregoing image deterioration due to a jiggle, a method in which image capturing is performed by driving the optical system so as to reduce an image shake and a method in which image processing is performed by use of a hand-jiggle amount obtained through an angular-velocity sensor or the like so as to reduce an image shake have been proposed (e.g., refer to Patent Document 1).

Patent Document 1: Japanese Patent Application Laid-Open No. 1994-27512 (Page 7 and FIG. 1).

SUMMARY OF THE INVENTION

However, the image-shake correction method through image processing may cause noise, such as ringing, in a corrected image, thereby further deteriorating the image quality. In particular, in the case where image processing is applied to an image having a large image-shake amount, such deterioration becomes remarkable. The present invention has been implemented in consideration of the foregoing problem; it is the objective of the present invention to obtain an image with noise reduced, with an image processing device in which an image shake is corrected through image processing.

An image processing device according to the present invention includes an image correction means for applying image-shake correction processing to an input image; a correction-image characteristic detection means for detecting a characteristic of a correction image obtained through the image-shake correction processing; and an image outputting means for outputting the input image or the correction image, based on a result of the detection.

According to the present invention, an image in which noise such as ringing is reduced can be obtained.

EXPLANATION OF REFERENCE CHARACTERS 10, 20, 30, and 40: IMAGE-PROCESSING DEVICE
101: INPUT-IMAGE FRAME MEMORY
102: IMAGE CORRECTION MEANS
103: CORRECTION-IMAGE FRAME MEMORY
104: CORRECTION-IMAGE EDGE DETECTION MEANS
105: FIRST EDGE DETERMINATION MEANS
106: IMAGE OUTPUTTING MEANS
204: INPUT-IMAGE EDGE DETECTION MEANS
205: SECOND EDGE DETERMINATION MEANS
307: FIRST SELECTION-INFORMATION CHANGING MEANS
407: SECOND SELECTION-INFORMATION CHANGING MEANS
408: FIRST GAIN CONTROLLER
409: SECOND GAIN CONTROLLER
411: ADDER

BEST MODE FOR CARRYING OUT THE INVENTION

Embodiment 1

The present invention will be explained in detail below, with reference to the drawings that show its embodiments.

Based on information about a correction image obtained by applying image processing to an input image, an image processing device 10 according to Embodiment 1 selects and outputs the input image or the correction image so as to reduce ringing or the like caused by the image processing.

In other words, an image shake may be caused in the input image. In contrast, in the correction image obtained by applying image processing to the input image, the image shake is reduced; however, the image processing may cause noise such as ringing. In an image processing device according to Embodiment 1, a pixel, in the correction image, determined to include noise is replaced by a pixel in the input image so as to reduce noise in an output image.

Figure 1:
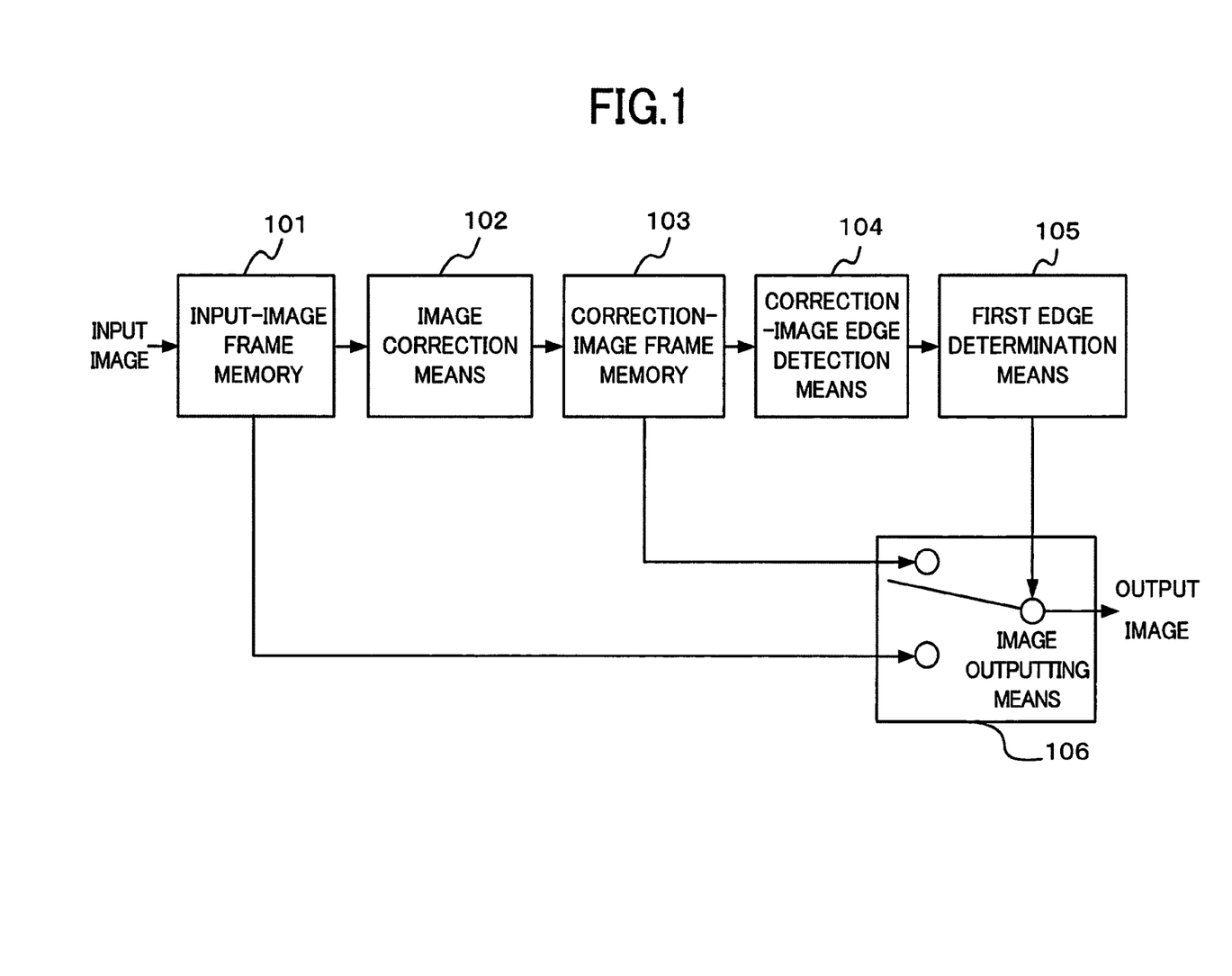
FIG. 1 is a block diagram illustrating the configuration of an image processing device according to Embodiment 1 of the present invention.

FIG. 1 is a block diagram illustrating the configuration of an image processing device 10 according to Embodiment 1. In FIG. 1, in the first place, an input image obtained through a camera, an image-capturing element, or the like is inputted to and stored in an input-image frame memory 101. Next, the input image outputted from the input-image frame memory 101 is inputted to an image correction means 102 where image processing for image-shake correction is applied to the input image. In addition, the image-correction algorithm of the image correction means 102 will be described later.

An image obtained through the correction processing in the image correction means 102 (referred to as a "correction image", hereinafter) is inputted to and stored in a correction-image frame memory 103. Additionally, the correction image outputted from the correction-image frame memory 103 is inputted to a correction-image edge detection means 104 where edge components in the correction image are detected. In addition, edge detection processing in the correction-image edge detection means 104 will be described later.

The correction image from which edge components have been detected (referred to as an "edge-detected correction image") is inputted to a first edge-determination means 105. Based on information about the edge-detected correction image, the first edge determination means 105 determines, for each pixel, whether the edge is the original edge of the image or noise such as a pseudo edge which is not the original edge, and then outputs the determination result to an image outputting means 106. In addition, the pixel that has been determined not to be the original edge of the image may be a constituent portion of a picture pattern or a flat portion in the picture pattern. Edge determination processing in the first edge-determination means 105 will also be described later.

Based on the determination result inputted from the first edge-determination means 105, the image outputting means 106 selects, for each pixel, the input image or the correction image and outputs the selected image as an output image, so as to perform image output processing.

<Image-Correction Means>

Next, the details of the processing in each constituent element will be explained. In the first place, the image correction means 102 will be explained. The image correction algorithm of the image correction means 102 according to Embodiment 1 utilizes an inverse filter derived from the least square method with constraint conditions. In other words, the image correction algorithm is characterized by utilizing an impulse response function that indicates an image-shake amount and an inverse filter, of the impulse response function, which is calculated from the impulse response function. On this occasion, the algorithm for the inverse filtering may be what solves a problem of minimizing the square norm of an image whose characteristic is extracted. In addition, the square norm is what is calculated as the sum of the squares of the elements of a vector. Additionally, in Embodiment 1, as a characteristic amount, edge information extracted through a Laplacian operator is employed. That is to say, the image correction means 102 calculates an image-shake correction image, as a solution of a problem of minimizing the square norm of edge information extracted by means of the Laplacian operator.

In addition, in order to calculate the inverse filter of an impulse response function, it is required to preliminarily calculate the impulse response function. The method of calculating the impulse response function may be a method of performing mathematical presumption based on two images captured with different shutter speeds or a method of performing the calculation by processing a physical signal obtained through an acceleration sensor or the like. In Embodiment 1, the detailed explanation for the method of calculating the impulse response function will be omitted.

Next, a specific method in which, after the impulse response function is calculated, a correction image is obtained from an input image will be explained.

In the first place, the input image and the correction image are each rendered in a vector-matrix representation, by use of a mathematical image model represented by Equation (1). In Equation (1), (i, j) indicates the position of a pixel; in the case of an image having a size of M pixels in the vertical direction of a frame and N pixels in the horizontal direction of the frame, "i" and "j" are integer values, i.e., i=1, - - - , M and j=1, - - - , N, respectively.

$$t_{i,j} = \sum_{l=-L}^{L}\sum_{k=-K}^{K} h_{kl} s_{i-k,j-l} + v_{i,j} \qquad (1)$$

In addition, it is assumed that $s_{i,j}$ is a pixel signal for an image in which an image-shake has been reduced, i.e., a correction image, $t_{i,j}$ is a pixel signal for an image in which an image-shake has been caused, i.e., an input image, $v_{i,j}$ is an additional-noise component produced during image capturing, and $h_{k,l}$ is an impulse response function that indicates an image-shake amount. Additionally, it is assumed that (2K+1) calculated from "K" is the order, in the vertical direction of the frame, of the impulse response function, and (2L+1) calculated from "L" is the order, in the horizontal direction of the frame, of the impulse response function. In this regard, however, it is assumed that the respective average values of the input image and the correction image are zeroes.

This assumption can be calculated by, based on pixel signals for each image, calculating the average value of the image, i.e., the bias value of a captured image obtained through an image-capturing element, and by subtracting the bias value from all the pixel signals. Furthermore, assuming that the expected value is equal to the average value (ergodic), $E[\bullet]$, as what represents the expected value of "$\bullet$", can be represented by the following equation: $E[s_{i,j}]=0$ $E[t_{i,j}]=0$ Additionally, it is assumed that additional noise $V_{i,j}$ has a nature that $E[s_{i,j} v_{i\,a,j\,a}]=0$ (ia and ja are arbitrary numbers). This assumption is an assumption derived from the fact that additional noise is almost independent of an image to be captured.

Next, the elements, to be obtained, of the correction image and the input image are extracted in a lexicographic array so as to be defined by "Vs" and "Vt" as column vectors, and a matrix corresponding to the impulse response function is represented by "H". In addition, as is the case with the impulse response function, the Laplacian operator is represented by a matrix, i.e., "C". On this occasion, the matrices "H" and "C" are block Toeplitz matrices; therefore, because approximate diagonalization can be performed by approximately utilizing the two-dimensional discrete Fourier transformation (referred to as "DFT", hereinafter), high-speed computing processing can be carried out. By utilizing the foregoing mathematical quantities, an edge-extraction amount $J_1$ extracted, by use of a Laplacian operator, from the input image can be represented as in Equation (2).

$$J_1 = \|Cvs\|^2 \qquad (2)$$

Here, $\|\bullet\|$ denotes the second norm of "$\bullet$". In general, in an image, the correlation between adjacent pixels is large and the edge-extraction amount is small; therefore, minimization of $J_1$ represented by Equation (2) may be performed by use of the least square method with constraint conditions. As the constraint condition in this case, Equation (1) is held in the input image; thus, it is conceivable that, as the power of the additional noise, the relationship represented by Equation (3) exists. Accordingly, by solving the minimization problem in which the constraint condition of Equation (3) is added to Equation (2), correction of an image can be performed.

$$\|vt - Hvs\|^2 = \rho^2 \qquad (3)$$

The evaluation function to be finally minimized can be represented as in Equation (4), letting γ denote the reciprocal of the Lagrange's undetermined multiplier.

$$J=\|vt-Hvs\|^2-\rho^2+\gamma\|Cvs\|^2 \quad (4)$$

After that, by partially differentiating Equation (4) with respect to the correction image vs to be obtained, the presumed value vss of the correction image to be obtained can be represented as in Equation (5).

$$vss=(H^TH+\gamma C^TC)^{-1}H^Tvt \quad (5)$$

In this situation, because Equation (5) includes large-size block Toeplitz matrices, a large amount of calculation is required to obtain a precise solution. However, by performing approximate diagonalization by use of DFT matrices, the solution can be obtained with a practical amount of calculation.

In addition, the superscript "T" notated above and immediately to one side of each variable in Equation (5) indicates the matrix transposition. Additionally, the respective vector elements obtained by applying the DFT to the correction image vs and the input image vt are represented by $VSS(v_1, v_2)$, $T(v_1, v_2)$; the respective diagonal elements of the matrices obtained by approximately diagonalizing the matrices "H" and "C" by use of the DFT matrices are represented by $H((v_1, v_2)$, $C(v_1, v_2)$. Here, $v_1$ and $v_2$($v_1=v_{1\ 1}, \ldots, v_{1\ M}$ and $v_2=v_{2\ 1}, ---, v_{2\ N}$) are a spatial frequency component in horizontal direction and a spatial frequency component in vertical direction, respectively.

By utilizing these mathematical quantities, the correction image in the DFT domain is given by Equation (6).

$$VSS(v_1, v_2) = \quad (6)$$

$$\frac{H^*(v_1, v_2)}{|H(v_1, v_2)|^2+\gamma|C(v_1, v_2)|^2}T(v_1, v_2)(H^*: \text{complex conjugation})$$

Accordingly, the correction image can be calculated by applying the two-dimensional discrete Fourier transformation to $VSS(v_1, v_2)$.

As described above, in Embodiment 1, as the image-correction algorithm in the image correction means 102, the foregoing method is utilized; however, for example, the methods set forth in the following literatures may be used.

Literature 1: "Digital Image Restoration" written by H. C. Andrews et al., published by Prentice Hall Literature 2: "Probability System Theory III" written by Sueo Sugimoto, Chapter II edited by Yoshifumi Sunahara, published by Asakura Shoten Literature 3: "Fundamentals of Digital Image Processing" written by Anil K. Jain, published by Prentice Hall Literature 4: "Image Processing Algorithm" written by Tsuneo Saito, published by Kindaikagaku <Correction-Image Edge Detection Means>

Next, the correction-image edge detection means 104 will be explained. The correction-image edge detection means 104 performs edge detection processing for detecting edge components in a correction image. In addition, a correction image is a color image; however, the correction-image edge detection means 104 in Embodiment 1 applies the edge detection processing to the luminance signal for a correction image. Additionally, the edge detection processing is performed in the horizontal direction as well as in the vertical direction.

Figure 2:
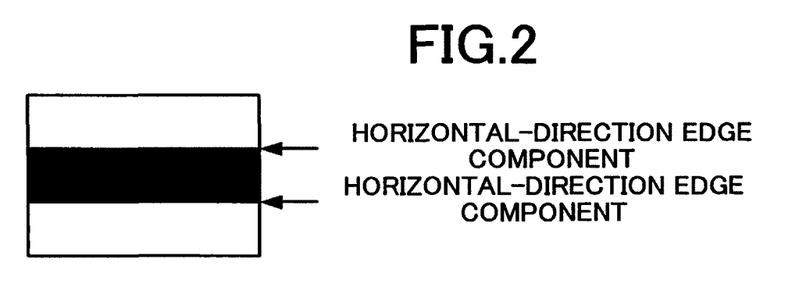
FIG. 2 is a chart representing edge components, in the horizontal direction, of an image.
Figure 3:
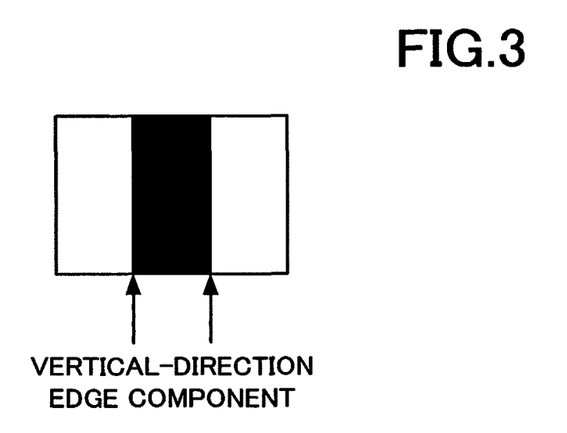
FIG. 3 is a chart representing edge components, in the vertical direction, of an image.

An example of a horizontal-direction edge component in an image and an example of a vertical-direction edge component are illustrated in FIGS. 2 and 3, respectively. In addition, the horizontal-direction edge component indicates an edge extending approximately in the horizontal direction, and the vertical-direction edge component indicates an edge extending approximately in the vertical direction.

In the first place, the detection processing for a horizontal-direction edge component will be explained. In the correction-image edge detection means 104 according to Embodiment 1, a Sobel filter "H" represented by Equation (7) is utilized to detect a horizontal-direction edge component. That is to say, filtering processing through the filter represented by Equation (7) is applied to the luminance signal for each of pixels in a correction image, so that a horizontal-direction edge component ImgH1 is obtained for each pixel.

$$H = \begin{bmatrix} 1 & 2 & 1 \\ 0 & 0 & 0 \\ -1 & -2 & -1 \end{bmatrix} \quad (7)$$

Similarly, a Sobel filter "V" represented by Equation (8), i.e., the transpose H' of the matrix "H" represented by Equation (7) is utilized to detect a vertical-direction edge component. That is to say, the filtering processing through the filter represented by Equation (7) is applied to the luminance signal for each of pixels in a correction image, so that a vertical-direction edge component ImgV1 is obtained for each pixel.

$$V = H' = \begin{bmatrix} 1 & 0 & -1 \\ 2 & 0 & -2 \\ 1 & 0 & -1 \end{bmatrix} \quad (8)$$

After obtaining the horizontal-direction edge component ImgH1 and the vertical-direction edge component ImgV1 for each pixel, the correction-image edge detection means 104 outputs an edge-detected correction image ImgS1 represented by Equation (9). As represented by Equation (9), the edge-detected correction image ImgS1 is the absolute sum, for each pixel, of the horizontal-direction edge component ImgH1 and the vertical-direction edge component ImgV1.

$$\text{ImgS1}=\text{abs}(\text{ImgH1})+\text{abs}(\text{ImgV1}) \quad (9)$$

<First Edge Determination Means>

Next, the first edge determination means 105 will be explained. The first edge determination means 105 performs, for each of pixels in an edge-detected correction image, edge determination processing for determining whether a specific pixel includes noise or whether the specific pixel is a pixel for the original edge portion of the image.

The edge determination processing by the first edge-determination means 105 is performed in such processing as described below. Firstly, as represented by Equation (10), the edge-detected correction image ImgS1 and a first threshold value thre_res are compared. After that, in the case where the edge-detected correction image ImgS1 is smaller than the first threshold value thre_res, the pixel is determined to be noise or a pseudo edge such as ringing. In contrast, in the case where the edge-detected correction image ImgS1 is larger than the first threshold value thre_res, the pixel is determined to be an original edge portion of the image.

$$\text{ImgS1}<\text{thre\_res} \quad (10)$$

In the case where the edge-detected correction image ImgS1 is smaller than the first threshold value thre_res, i.e., in the case where the pixel is determined to be noise or a pseudo edge such as ringing, the first edge-determination means 105 outputs a pixel value "1" for the pixel. In addition, in the case where the edge-detected correction image ImgS1 is larger than the first threshold value thre_res, i.e., in the case where the pixel is determined to be an original edge portion of the image, the first edge-determination means 105 outputs a pixel value "0" for the pixel. In other words, what is outputted from the first edge-determination means 105 is a binarized image, which is binarized. The image outputting means 106 described later utilizes the binarized image, as image-selection information.

In addition, the first threshold value thre_res for the edge determination processing may be a predetermined constant or may be decided based on image information such as the image storing format, the size of an image file, or the contents of an image.

Figure 4:
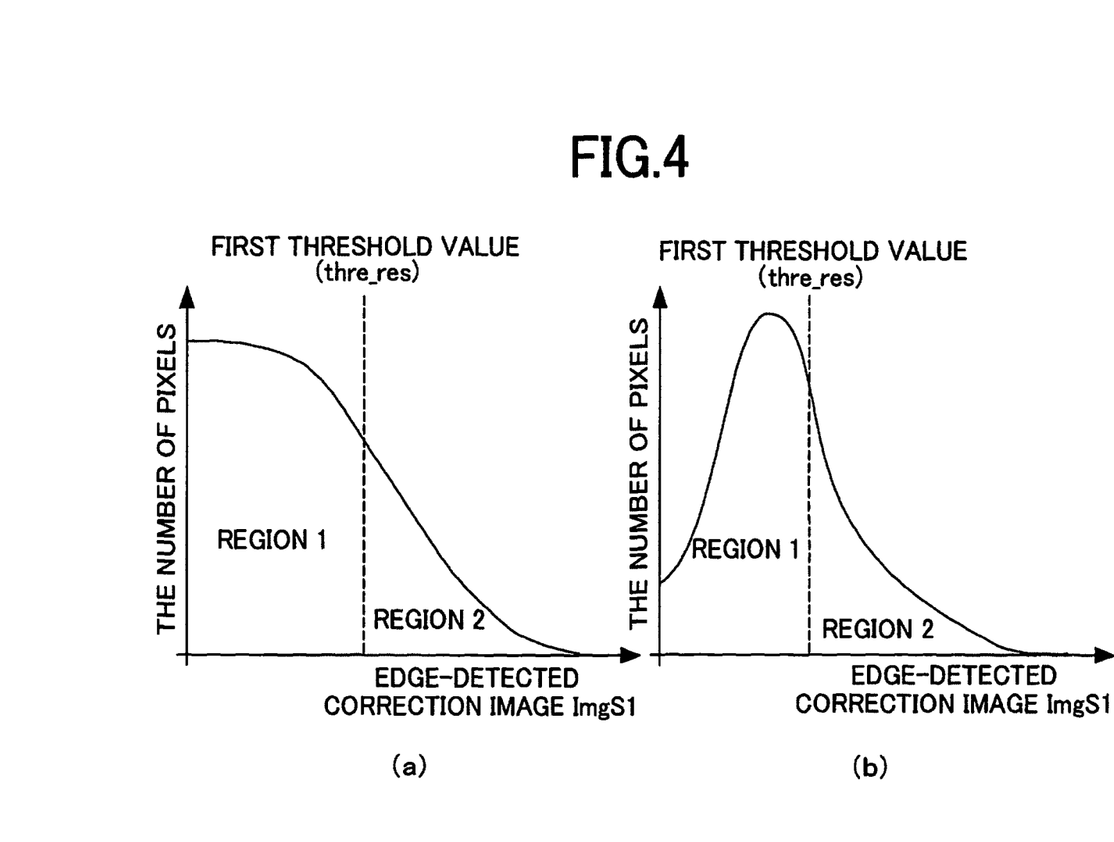
FIG. 4 is graphs each representing the distribution of an edge-detected correction image.

Methods of deciding, based on the contents of an image, the first threshold value thre_res include, for example, a method in which, as represented in FIGS. 4(a) and 4(b) with the ordinate denoting the number of pixels and the abscissa denoting the edge-detected correction image ImgS1, the distribution of the edge-detected correction image ImgS1 is obtained so as to decide the first threshold value thre_res. In each of FIGS. 4(a) and 4(b), pixels in the region 1 that is situated to the left of the first threshold value thre_res are determined to be noise or pseudo edges such as ringing; pixels in the region 2 that is situated to the right of the first threshold value thre_res are determined to be original edge portions of the image. In addition, in an experiment, an excellent result was obtained when the first threshold value thre_res was decided in such a way that approximately 10% of all the pixels that configure an image fell within the region 1. In this regard, however, the proportion of pixels that fall within the region 1 may adaptively be decided based on the distribution shape of the edge-detected correction images ImgS1 or a statistic quantity such as the average value of the edge-detected correction images ImgS1.

Additionally, a method in which the first threshold value thre_res is decided based on a function of an image-shake amount may be utilized. For example, as Equation (11), the first threshold value thre_res is decided by the image-shake amount "x" and a coefficient "k". In addition, a function, of an image-shake amount, other than the function represented by Equation (11) may be utilized.

$$thre\_res = k \cdot x \quad (11)$$

<Image Outputting Means>

Next, the image outputting means 106 will be explained. By utilizing, as selection information, the binarized image outputted from the first edge-determination means 105, the image outputting means 106 performs the image output processing for selecting and outputting, for each pixel, the input image or the correction image. As described above, the first edge-determination means 105 outputs the pixel value "1" for the pixel that is determined to be noise or a pseudo edge such as ringing. Additionally, the first edge-determination means 105 outputs the pixel value "0" for the pixel that is determined to be an original edge portion of the image.

Based on the foregoing pixel values, the image outputting means 106 selects, for the pixel corresponding to the pixel value "1", the input image stored in the input-image frame memory 101 and as an output image, outputs the selected input image.

In contrast, the image output means 106 selects, for the pixel corresponding to the pixel value "0", the correction image stored in the correction-image frame memory 103 and as an output image, outputs the selected correction image.

As discussed above, for the pixel having the pixel value "1", i.e., the pixel that may include noise or a pseudo edge such as ringing caused through image processing, not a correction image but an input image is selected and outputted, whereby noise can be eliminated. Additionally, for the pixel having the pixel value "0", i.e., the pixel that is determined to be an original edge portion of the image, the image-processed correction image is outputted, whereby an image shake that has been caused in the input image can be reduced.

As described above, based on information about the correction image obtained by applying image processing to an input image, the image processing device 10 according to Embodiment 1 selects and outputs the input image or the correction image. Accordingly, noise such as ringing caused through image processing can be reduced, whereby an image having excellent image quality can be obtained.

In addition, with regard to the correction-image edge detection means according to Embodiment 1, a case in which a Sobel filter is utilized for edge detection processing to perform edge detection has been explained; however, the present invention is not limited thereto, and any means may be utilized as long as it can demonstrate the effect on edge detection. Additionally, a case has been explained in which the filtering processing is performed both in the horizontal direction and in the vertical direction; however, the filtering processing may be performed only in either one of these directions. Furthermore, a case has been explained in which the edge detection processing is applied to a luminance signal; however, color-difference signals or R,G, and B signals may be utilized, and a combination of information pieces about these colors may be utilized.

In addition, with regard to the first edge-determination means according to Embodiment 1, a case in which a threshold value is set based on the absolute value of an edge-detected correction image so as to perform edge detection processing has been explained; however, the present invention is not limited thereto, and any means may be utilized as long as it can demonstrate the same effect. Additionally, the pixel value of a pixel that is determined to be noise and the pixel value of a pixel that is an original edge portion of the image are indicated "1" and "0", respectively; however, these pixels may be indicated the other way around. Furthermore, the first edge-determination means may output the signal only in the case where the pixel value is indicated "1" or in the case where the pixel value is indicated "0".

Additionally, a case in which the edge detection processing, the edge determination processing, and the image output processing are performed per pixel has been explained; however, each of these processing items may be performed per predetermined region such as a macro block or a block. In this case, the average value of the pixel values of all the pixels, or the pixel value of the representative pixel, in the predetermined region is utilized.

Additionally, a method in which processing is performed by use of an image edge has been explained; however, anything, other than an edge, which indicates the characteristics of an image may be utilized.

The image processing device 10 according to Embodiment 1 can be applied to the correction of an image shake caused by a hand jiggle; however, the image processing device 10 can be applied to other image shakes than the one caused by a hand jiggle; moreover, the image processing device 10 can also be applied, for example, to an image shake caused by the movement of the image-capturing system itself.

Embodiment 2

Figure 5:
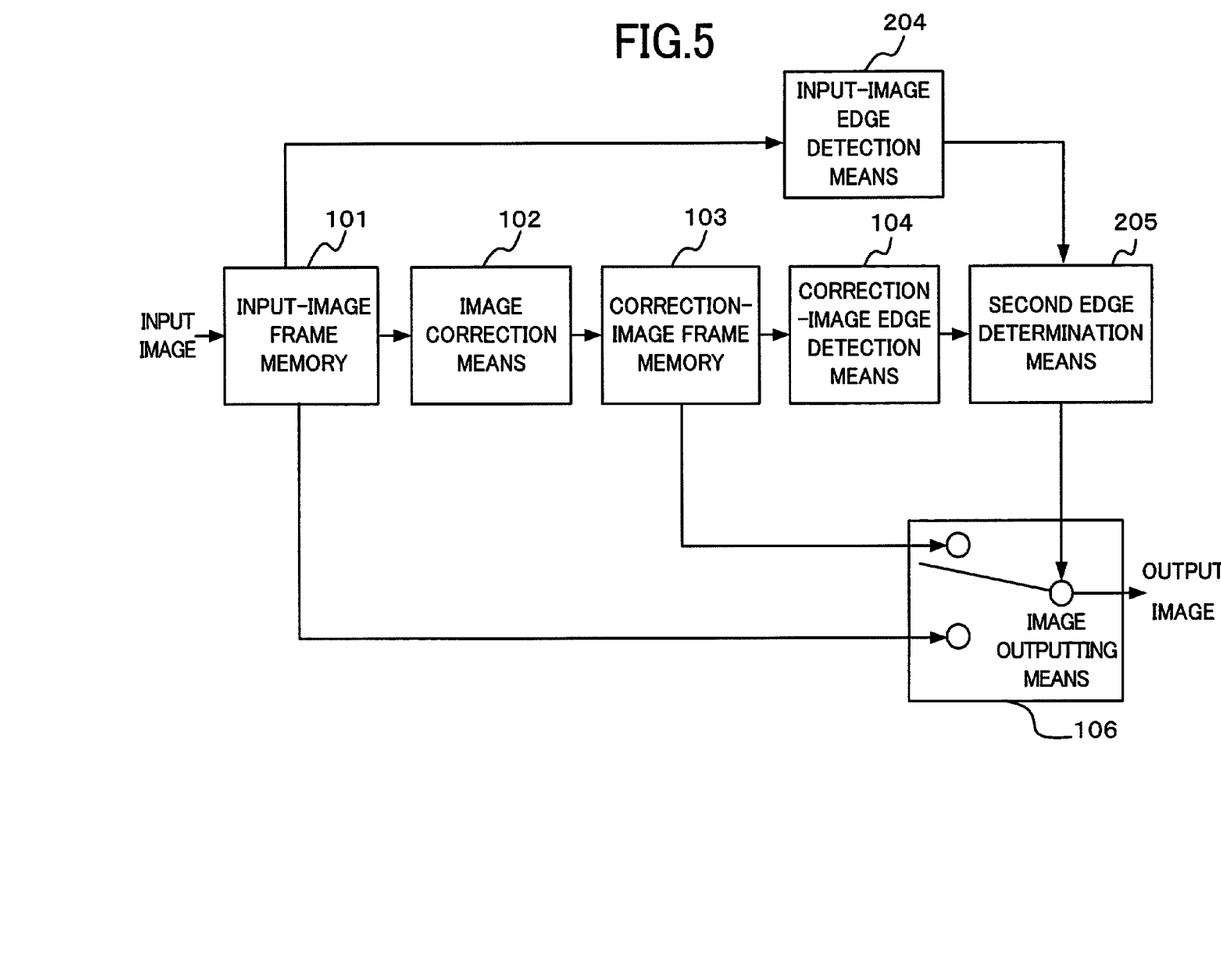
FIG. 5 is a block diagram illustrating the configuration of an image processing device according to Embodiment 2 of the present invention.

An image processing device 20 according to Embodiment 2 is configured by adding an input-image edge detection means 204 to the image processing device 10 according to Embodiment 1. Additionally, as a constituent element corresponding to the first edge determination means 105, a second edge determination means 205 is included. The second edge determination means 205 performs edge determination processing, based on the output from the input-image edge detection means 204 and the output from the correction-image edge detection means 104.

FIG. 5 is a block diagram illustrating the configuration of the image processing device 20 according to Embodiment 2. In FIG. 5, constituent elements indicated by the same reference numerals as those in FIG. 1 are identical to or equivalent to the constituent elements in the image processing device 10 according to Embodiment 1.

<Input-Image Edge Detection Means>

In the first place, the input-image edge detection means 204 will be explained. The input-image edge detection means 204 performs edge detection processing for detecting edge components in an input image and outputs an edge-component-detected image (referred to as an "edge-detected input image", hereinafter). In addition, the edge detection processing performed by the input-image edge detection means 204 is similar to the edge detection processing, described in Embodiment 1, performed by the correction-image edge detection means 104.

That is to say, after obtaining a horizontal-direction edge component ImgH2 and a vertical-direction edge component ImgV2 for each pixel, the input-image edge detection means 204 outputs an edge-detected input image ImgS2 represented by Equation (12).

$$ImgS2 = abs(ImgH2) + abs(ImgV2) \quad (12)$$

<Second Edge Determination Means>

Next, the second edge determination means 205 will be explained. The second edge determination means 205 performs, for each pixel, edge determination processing for determining whether a specific pixel includes noise or whether the specific pixel is a pixel for an original edge portion of the image, based on an edge-detected correction image outputted from the input-image edge detection means 204 and an edge-detected input image outputted from the correction-image edge detection means 104.

The edge determination processing by the second edge-determination means 205 is performed in such processing as described below. Firstly, the edge-detected correction image ImgS1 and the first threshold value thre_res are compared. Furthermore, the edge-detected input image ImgS2 and a second threshold value thre_deg are compared. Then, when Equation (13) is satisfied, i.e., only in the case where both the edge-detected correction image and the edge-detected input image are smaller than the corresponding threshold values, the second determination means 204 determines a specific pixel to be noise caused through the image processing by the image correction means 102 and then outputs the pixel value "1" for the specific pixel. In contrast, in other cases, the second edge-determination means 205 outputs the pixel value "0".

Figure 6:
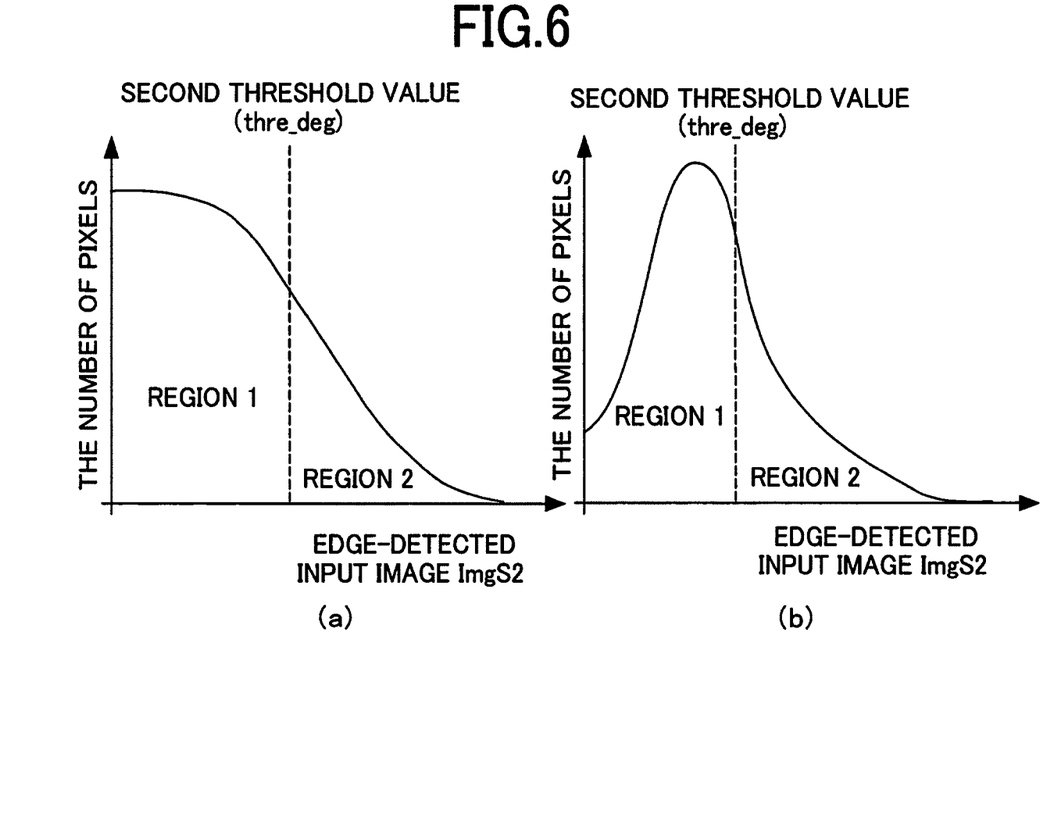
FIG. 6 is graphs each representing the distribution of an edge-detected input image.

In other words, the second determination means 205 determines only the pixels, which fall within the region 1 situated left to the first threshold value thre_res in FIGS. 4(a) and 4(b) with the ordinate denoting the number of pixels and the abscissa denoting the edge-detected correction image ImgS1 and fall within the region 1 situated left to the second threshold value thre_deg in FIGS. 6(a) and 6(b) with the ordinate denoting the number of pixels and the abscissa denoting the edge-detected input image ImgS2, to be noise caused through the correction processing by the image correction means 102, and then outputs the pixel value "1" for each of those pixels.

$$ImgS1 < thre\_res, \text{ and, } ImgS2 < thre\_deg \quad (13)$$

The reason why the above processing method has been employed is explained below. That is to say, in the case where the edge-detected input image ImgS2 is larger than the second threshold value thre_deg, the pixel can be considered to be an original edge portion of the image. However, in some cases, the edge-detected correction image ImgS1 with regard to the pixel is smaller than the first threshold value thre_res. In such cases, if, as is the case with Embodiment 1, the output image is decided based on the relationship between the edge-detected correction image ImgS1 and the first threshold value thre_res, the input image having an image shake may be outputted. Accordingly, although noise such as ringing in the output image is reduced, a blur may be caused at the periphery of the image, due to the image shake.

In Embodiment 2, in consideration of the foregoing cases, for the pixel that is determined to be an original edge portion of the image, i.e., the pixel whose edge-detected input image ImgS2 is larger than the second threshold value thre_deg, not the input image that may include an image shake, but the correction image in which the image shake has been reduced is outputted, whereby the image quality of the output image is enhanced.

In addition, as is the case with Embodiment 1, for the pixel corresponding to the pixel value "1", the image outputting means 106 selects the input image stored in the input-image frame memory 101 and for the pixel corresponding to the pixel value "0", selects the correction image stored in the correction-image frame memory 103; then, the image output means 106 outputs the selected input and correction images, as an output image. In other words, what is outputted from the second edge-determination means 205 is a binarized image, which is binarized.

As described above, the image processing device 20 according to Embodiment 2 performs the edge determination processing, based on a correction image and an input image. Accordingly, a correction image is outputted at an original edge portion of the image; therefore, an output image having improved image quality can be obtained.

In addition, the method of deciding the second threshold value thre_deg may be the same as the method, of deciding the first threshold value thre_res, which has been explained in Embodiment 1.

Additionally, a case in which, as is the case with Embodiment 1, threshold values are set so as to perform the edge detection processing has been explained; however, the present invention is not limited thereto, and any means may be utilized as long as it can demonstrate the same effect. Additionally, the pixel that is determined to be noise and the pixel that is an original edge portion of the image are indicated "1" and "0", respectively; however, these pixels may be indicated the other way around. Furthermore, the signal may be outputted only in the case where the pixel value is indicated "1" or in the case where the pixel value is indicated "0".

Embodiment 3

Figure 7:
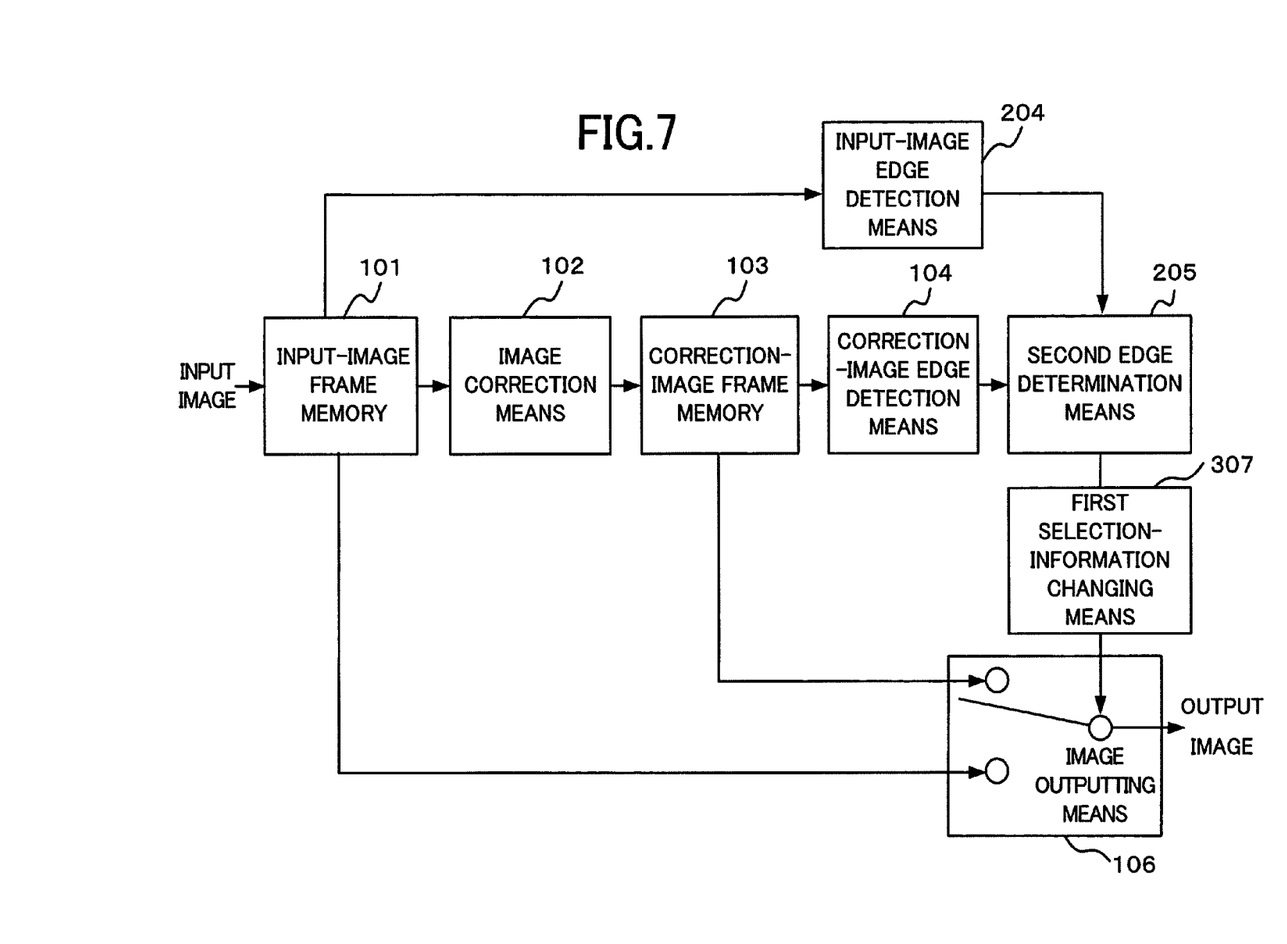
FIG. 7 is a block diagram illustrating the configuration of an image processing device according to Embodiment 3 of the present invention.

An image processing device 30 according to Embodiment 3 is configured by adding a first selection-information changing means 307 to the image processing device 20 according to Embodiment 2. The first selection-information changing means 307 appropriately changes selection information outputted from the second edge determination means 205 and outputs the changed information to the image outputting means 106. Then, the image outputting means 106 selects and outputs an input image or a correction image, based on the changed information.

FIG. 7 is a block diagram illustrating the configuration of an image processing device 30 according to Embodiment 3. In FIG. 7, constituent elements indicated by the same reference numerals as those in FIG. 5 are identical to or equivalent to the constituent elements in the image processing device 20 according to Embodiment 2.

<First Selection-Information Changing Means>

In the first place, the first selection-information changing means 307 will be explained. As explained in Embodiment 2, in the second edge determination means 205, the edge determination is performed based on an edge-detected input image and an edge-detected correction image. On this occasion, in a group of pixels that are determined to be within an original edge portion of the image, for example, only one pixel (referred to as an "isolated pixel", hereinafter) that is determined to be noise may intrude. In this case, the output image is in such a way that the input image intrudes in the correction image; therefore, the input image, i.e., the isolated pixel may visually be determined to be noise. The first selection-information changing means 307 performs isolated-pixel elimination processing for eliminating the isolated pixel.

The isolated-pixel elimination processing by the first selection-information changing means 307 will be explained below. In the first place, as explained in Embodiment 2, the second edge determination means 205 outputs selection information in which the pixel that is determined to be noise and the pixel that is an original edge portion of the image are indicated "1" and "0", respectively.

The first selection-information changing means 307 performs filtering processing by use of a median filter. In addition, a median filter is to detect the pixel values of pixels within a set region and then selects the pixel value of the pixels that account for the majority. For example, in the case where the set region for the median filter is 3 pixels in height by 3 pixels in width and the pixel values in the region are {0, 0, 0, 0, 0, 1, 1, 1, 1}, five pixels having the pixel value "0" and four pixels having the pixel value "1" exist; thus, after the filtering processing through the median filter, all the pixel values become "0". As described above, the first selection-information changing means 307 eliminates an isolated pixel, by use of a median filter.

In other words, the first selection-information changing means 307 changes a binarized image, i.e., selection information, outputted from the second edge determination means 205, with reference to selection information pieces on other pixels, and outputs the changed information.

As described above, the image processing device 30 according to Embodiment 3 eliminates an isolated pixel, by use of the first selection-information changing means 307. As a result, the image quality of an output image is enhanced.

In addition, as the median filter utilized in the first selection-information changing means 307, a median filter having a size of 3 pixels in height by 3 pixels in width has been explained; however, the present invention is not limited thereto, and a median filter, e.g., of 19 pixels in height by 19 pixels in width may be utilized. Moreover, the median filter may have a shape other than a rectangle.

Still moreover, any other means than a median filter may be utilized as long as it can eliminate an isolated pixel.

In addition, it has been explained that the image processing device 30 is configured by adding the first selection-information changing means 307 to the image processing device 20 according to Embodiment 2; however, the image processing device 30 may be configured by adding the first selection-information changing means 307 to the image processing device 10 according to Embodiment 1.

Embodiment 4

Figure 8:
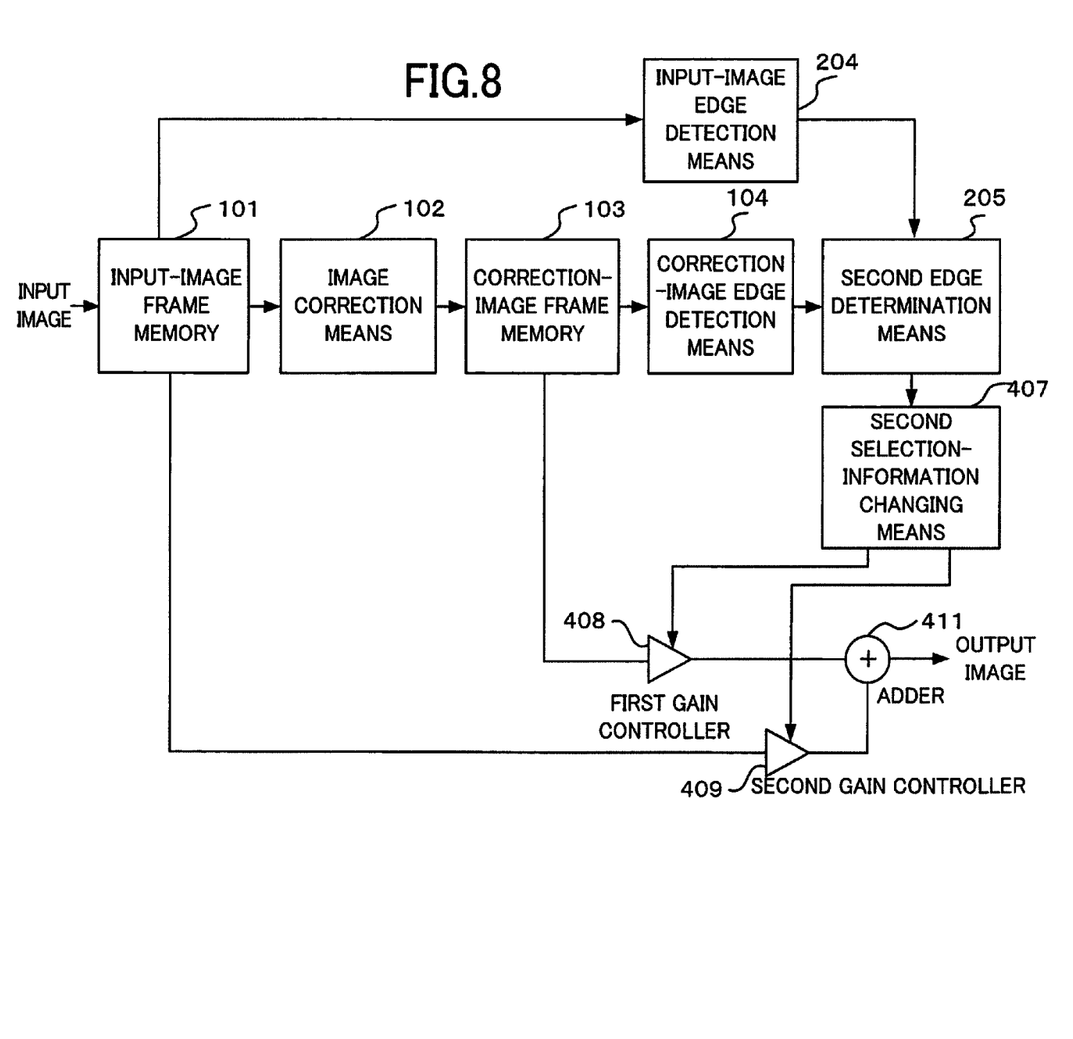
FIG. 8 is a block diagram illustrating the configuration of an image processing device according to Embodiment 4 of the present invention.

An image processing device 40 according to Embodiment 4 is configured by adding a second selection-information changing means 407 to the image processing device 20 according to Embodiment 2. Additionally, the part corresponding to the image outputting means 106 is configured with a first gain controller 408, a second gain controller 409, and an adder 411.

FIG. 8 is a block diagram illustrating the configuration of the image processing device 40 according to Embodiment 4. In FIG. 8, constituent elements indicated by the same reference numerals as those in FIG. 5 are identical to or equivalent to the constituent elements in the image processing device 20 according to Embodiment 2.

<Second Selection-Information Changing Means>

In the first place, the second selection-information changing means 407 will be explained. As explained in Embodiment 3, an isolated pixel may intrude in a binarized image outputted from the second edge determination means 205. The second selection-information changing means 407 performs isolated-pixel elimination processing for eliminating the isolated pixel; it performs lowpass-filter processing as the isolated-pixel elimination processing. For example, in the case where the pixel values are {0, 1, 0, 1, 1, 0} and a three-tap lowpass filter is utilized, the pixel values after the filter processing become {0.25, 0.5, 0.5, 0.75, 0.75, 0.25}. In other words, the binarized image outputted from the second edge determination means 205 is converted by the second selection-information changing means 407 into a grayscale image in which pixel values are real numbers $K_{i,j}$ from 0 to 1. In addition, "i", "j" indicate the position of a pixel. That is to say, the second selection-information changing means 407 changes a binarized image, i.e., selection information, outputted from the second edge determination means 205, with reference to selection information pieces on other pixels, and outputs the changed information.

<First and Second Gain Controllers and Adder>

Next, the first gain controller (a first image-outputting device) 408, the second gain controller (a second image-outputting device) 409, and the adder (a third image-outputting device) 411 will be explained. $K_{i,j}$ outputted from the second selection-information changing means 407 is inputted to the first gain controller 408. Additionally, $1-K_{i,j}$ is inputted to the second gain controller 409. Here, letting $ImgIn_{ij}$ denote the pixel value of the input image at the coordinates (i, j) and $ImgC_{ij}$ denote the pixel value of the correction image at the coordinates (i, j), the processing represented by Equation (14) is performed in the first gain controller 408. In contrast, the processing represented by Equation (15) is performed in the second gain controller 409.

$$ImgC'_{ij}=ImgC_{ij}*K_{ij} \qquad (14)$$

$$ImgInt'_{ij}=ImgIn_{ij}*(1-K_{ij}) \qquad (15)$$

Then, the filtered input-image value $ImgIn'_{ij}$ and the filtered correction-image value $ImgC'_{ij}$ are outputted to the adder 411. In the adder 411, the filtered input-image value $ImgIn'_{ij}$ and the filtered correction-image value $ImgC'_{ij}$ are added, and then the sum is clipped in accordance with the number of bits for an output image and rounded to a whole number, so that the output image is outputted.

$$ImgOut=clip(ImgI'_{ij}+ImgC'_{ij}) \qquad (16)$$

That is to say, the first gain controller 408 functions as the first image-outputting device for correcting the correction image, with reference to changed information outputted from the second selection-information changing means 407, and outputting the corrected correction image. Additionally, the second gain controller 409 functions as the second image-outputting device for correcting the input image, with reference to changed information outputted from the second selection-information changing means 407, and outputting the corrected input image. Additionally, the adder 411 functions as the third image-outputting device for adding the corrected correction image outputted from the first gain controller 408 and the corrected input image outputted from the second gain controller 409 and then outputting an output image.

The selection information inputted to the second selection-information changing means 407 is binarized information consisting of "0" and "1"; however, the second selection-information changing means 407 may regard the binarized information as integers for a great number of gradations, e.g., integers for 256 gradations so as to perform therein lowpass-filter processing. That is to say, the second selection-information changing means 407 projects "0" to "0" and "1" to "255" so as to perform the lowpass-filter processing. Additionally, the filtering processing may be performed through a floating-point calculation or may approximately be performed through an integer calculation. In particular, the filtering processing through the integer calculation enables the speed of the filtering processing to be enhanced.

In addition, in the case where the projection to 256 gradations is performed, real-number creation processing for making $K_{i,j}$ and $[1-K_{i,j}]$ outputted from the second selection-information changing means 407 real numbers ranging from "0" to "1" is required; therefore, the second selection-information changing means 407 projects "0" to "0" and "1" to "255" and then outputs the projected figures.

In addition, in the foregoing description, in the case where the projection to 256 gradations is performed by the second selection-information changing means 407, $K_{i,j}$ and $1-K_{i,j}$ are made real and then outputted; however, $K_{i,j}$ and $1-K_{i,j}$ may be made real in such a way that no real-number creation processing is performed in the second selection-information changing means 407, and $K_{i,j}$ and $1-K_{i,j}$, as the original integers from "0" to "255", are outputted directly to the first gain controller 408 and the second gain controller 409, respectively, and then the integers are divided by 255 in the corresponding gain controllers.

As described above, the image processing device 40 according to Embodiment 4 performs the isolated-pixel elimination processing by use of a lowpass filter; therefore, the effect of the isolated-pixel elimination processing can be dispersed on the adjacent pixels, whereby the image quality of an output image is enhanced.

In addition, in Embodiment 4, a case in which, as the isolated-pixel elimination processing, lowpass-filter processing is utilized has been explained; however, the present invention is not limited thereto, and any means may be utilized as long as it can also demonstrate the effect of eliminating an isolated pixel.

Moreover, it has been explained that, from the second selection-information changing means 407, $K_{i,j}$ is outputted to the first gain controller 408 and $1-K_{i,j}$ is outputted to the second gain controller 409; however, only $K_{i,j}$ may be outputted from the second selection-information changing means 407 and calculated with $1-K_{i,j}$ in the second gain controller 409.

Still moreover, it has been explained that the image processing device 40 is configured by adding the second selection-information changing means 407 and the like to the image processing device 20 according to Embodiment 2 so as to make replacement; however, the application can be implemented in the image processing device 10 according to Embodiment 1.

The invention claimed is:

1. An image processing device comprising:
    an image correction unit for applying image-shake correction processing to an input image;
    a correction-image characteristic detection unit for detecting a characteristic of a correction image obtained through the image-shake correction processing;
    a first characteristic-determination unit for outputting selection information, based on a characteristic-detected correction image obtained through detection of the characteristic of the correction image;
    a second selection-information changing unit for outputting changed information obtained by changing the selection information;
    a first image outputting device for correcting and then outputting the correction image, based on the changed information;
    a second image outputting device for correcting and then outputting the input image, based on the changed information;
    and a third image outputting device for outputting an output image, based on the corrected input image and the corrected correction image.

2. The image processing device according to claim 1, wherein the second selection-information changing unit changes selection information on a predetermined region that is a subject of processing, with reference to selection information on a predetermined region other than the subject of processing.

3. The image processing device according to claim 2, wherein the second selection-information changing unit performs lowpass-filter processing.

4. An image processing method comprising:
    an image correction step of applying image-shake correction processing to an input image;
    a correction-image characteristic detection step of detecting a characteristic of a correction image obtained through the image-shake correction processing;
    a first characteristic-determination step of outputting selection information, based on a characteristic-detected correction image obtained through detection of the characteristic of the correction image;
    a second selection-information changing step of outputting changed information obtained by changing the selection information;
    a first image outputting step of correcting and then outputting the correction image, based on the changed information;
    a second image outputting step of correcting and then outputting the input image, based on the changed information;
    and a third image outputting step of outputting an output image, based on the corrected input image and the corrected correction image.

* * * * *